Dec. 31, 1963    F. R. CHARVAT    3,116,156
FUSED REFRACTORY GRAIN
Filed June 27, 1962

INVENTOR.
FEDIA R. CHARVAT
BY Frederick J. McCarthy

ATTORNEY

3,116,156
FUSED REFRACTORY GRAIN
Fedia R. Charvat, Williamsville, N.Y., assignor to Union Carbide Corporation, a corporation of New York
Filed June 27, 1962, Ser. No. 205,772
9 Claims. (Cl. 106—59)

The present invention relates to basic refractory bricks and to refractory material for the manufacture thereof.

At the present time, various chrome ores, particularly those obtained from Philippine deposits, are widely used in the manufacture of basic refractory bricks. While these ores are advantageous for this purpose due to their relatively low iron and calcium oxide content, such ores are diminishing, and quality is on the downgrade.

On the other hand, almost limitless quantities of chrome ore are readily available from South African deposits. However, these ores are quite high in iron content and in addition are extremely friable. Consequently, in spite of being relatively inexpensive, these ores have not been considered to be of high utility in the manufacture of basic refractory bricks.

In view of the prospects of degraded quality and the possibility of exhaustion of presently widely used chrome ores, it is considered that it would be of substantial benefit if the readily available and inexpensive, high iron chrome ores could be advantageously employed in the manufacture of high quality basic refractory bricks.

It is therefore an object of the present invention to employ high iron chrome ores in the manufacture of high quality basic refractory bricks.

It is another object of the present invention to provide an improved basic refractory brick.

Figure 1:
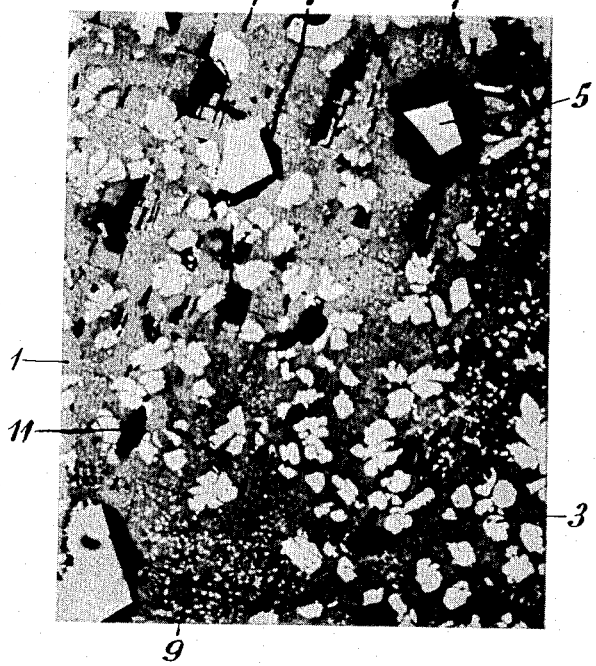
Figure 2:
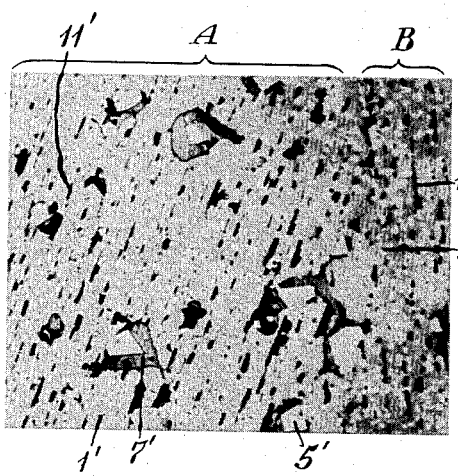
Figure 3:
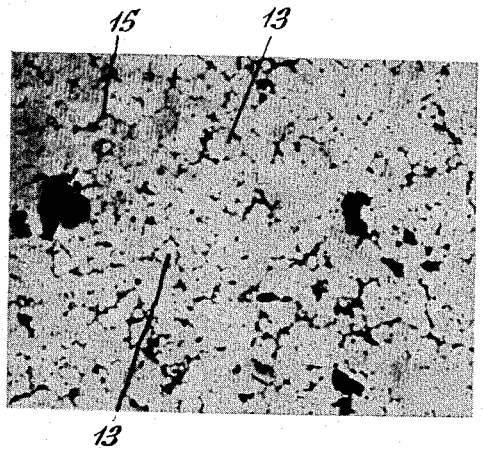

Other objects will be apparent from the following description and claims taken in conjunction with the accompanying photographs which show in FIGURES 1 and 2 the structures of refractory material of the present invention and in FIGURE 3 the structure of a refractory material of similar chemical composition but which is not the material of the present invention.

A refractory material in accordance with the present invention is a melted, re-solidified and particulated mixture of chrome ore and magnesia consisting essentially of by analysis 15 to 25 percent $Cr_2O_3$; 45 to 75 percent MgO; 4 to 20 percent $Al_2O_3$; 3.0 to 15.0 percent FeO; 0.5 to 3.0 percent $SiO_2$; and up to 3.0 percent CaO; the molar ratio of CaO to $SiO_2$ being no greater than 2:1 and the structure of said refractory material comprising predominantly, relatively large, abutting grains of periclase, crystals of spinel contained within said periclase grains, and isolated pockets of silicates which are separated by periclase.

The refractory material of the present invention, by virtue of its composition and structure is highly suitable for use in the manufacture of burned bricks and chemically bonded bricks due to its high density, low porosity, crushability properties and other characteristics more fully described hereinbelow.

In the practice of the present invention, a mixture of chrome ore and magnesia is provided to produce upon melting and re-solidification a refractory mass consisting essentially of, by analysis, the materials in the ranges set forth in Table I and having the aforedescribed structure.

TABLE I

| | |
|---|---|
| $SiO_2$ | 0.5 to 3.0 |
| CaO | up to 3.0 |
| MgO | 45 to 75 |
| FeO | 3 to 15 |
| $Cr_2O_3$ | 15 to 25 |
| $Al_2O_3$ | 4 to 20 |

The preferred compositional ranges for the refractory material of the present invention is set forth in Table II.

TABLE II

| | |
|---|---|
| $SiO_2$ | 0.5 to 1.5 |
| CaO | up to 1.0 |
| MgO | 60 to 70 |
| FeO | 5 to 10 |
| $Cr_2O_3$ | 14 to 20 |
| $Al_2O_3$ | 4 to 10 |

The melting and re-solidification of the chrome ore-magnesia mixture must be performed in a manner which ensures the formation in the refractory product of a structure as previously described. This is preferably and conveniently accomplished in an electric furnace in accordance with the technique known as "making a hearth."

In practice, a chrome ore-magnesia mix, e.g. 40 percent chrome ore, 60 percent MgO, is continuously fed into a conventional electric furnace which is heated by one or more carbon electrodes and the electrodes are gradually raised and withdrawn as a melt is formed in order to permit slow and gradual re-solidification of the melted material. It is essential in the present invention that the melt be rather slowly solidified as in "making a hearth" so as to permit the formation of the particular structure required in the refractory material, viz. large abutting periclase grains, spinel crystals contained within the periclase grains, and silicate material distributed in isolated pockets surrounded by periclase. The slow re-soldification promotes nucleation and growth of large periclase grains and results in the formation of an equilibrium structure which is stable throughout the usual operating temperatures encountered in service, i.e. up to 1750° C.

Although slow solidification of the melt is essential, once solidification has occurred, the solid hearth material should be cooled rather quickly to room temperature very soon after it is formed, preferably within about two hours in order that thermal stresses are set up in the solidified refractory material so that the crushability of the material is greatly enhanced. That is to say, the solidified refractory material is pre-stressed by the quick cooling which reduces the amount of energy required in subsequent crushnig operations. This feature, in conjunction with the characteristically large size of the periclase grains facilitates crushing of the material and avoids the formation of excessive fines.

The cooling of the refractory material is conveniently accomplished by water cooling the shell of the furnace in which the solidified material is contained.

In any event, in the present invention, slow and gradual solidification of the melt and rapid cooling of the solidified material is essential whereas quick freezing and slow cooling of the solidified material is to be avoided. Otherwise, the required equilibrium structure in the refractory material is not achieved and the advantageous properties of the present invention are not obtained.

The hearth of solid refractory material obtained by the aforedescribed procedure is broken out of the furnace after cooling and cleaned and crushed to the desired size by any suitable technique. The resulting particulated refractory material is characterized by high density, low porosity, and toughness, which properties are attributable to its composition, structure, and method of formation.

With particular regard to the structure of the refractory material of the present invention, reference is taken to FIGURE 1 which is a photomicrograph (original magnification 200×) of the structure of an electric furnace hearth product of this invention prepared in the manner previously described.

FIGURE 1 shows a portion of a periclase grain in which the periclase appears as a gray background indicated as 1. The periclase grain contains numerous exsolved dendrites of mixed spinel indicated as 3 and some euhedral crystals of spinel which are indicated as 5. FIGURE 1 also shows isolated pockets of silicates 7 occurring throughout the grain. Also shown in FIGURE 1 are cleavage lines or fractures 9, which are typical of periclase and which occur in cleavage planes within the periclase grain.

The very dark areas 11 and 11' which appear in FIGURES 1 and 2 are no part of the structure of the material of this invention and are merely cleavage pits in the periclase grains which developed during polishing.

The chemical analysis of the material of FIGURE 1 is 1.0 percent $SiO_2$, 5.9 percent $Al_2O_3$, 20.4 percent $Cr_2O_3$, 60.7 percent MgO, 10.4 percent FeO, 0.7 percent CaO.

FIGURE 2 is a photomicrograph (original magnification 100×) of portions of abutting periclase grains of the refractory material of this invention. The respective abutting grains are indicated generally as A and B and the cleavage pits 11' of the respective grains, which appear to intersect upon extension at an angle of about 26°, generally indicate the boundary of the separate periclase grains. As in FIGURE 1, it can be seen that the silicate material 7' occurs in discontinuous, isolated pockets separated by periclase, and spinel crystals 3' and 5' are contained in the periclase grains.

The composition of the material of FIGURE 2 is 14.59 percent $Cr_2O_3$, 71.45 percent MgO, 4.37 percent $Al_2O_3$, 7.11 percent FeO, 0.9 percent $SiO_2$, 1.61 percent CaO.

FIGURE 3 is a photomicrograph (original magnification 200×) of a refractory material having the same chemical analysis as that of FIGURE 1 but which was prepared by being melted, quick frozen and transferred directly to a furnace in which it was annealed from 1400° C. to room temperature over a period of 16 hours.

It can be seen that the material of FIGURE 3 is characterized by relatively small grains of periclase 13 surrounded by a substantially continuous phase 15 of silicate material. Although no spinel is evident in FIGURE 3, at high magnifications, minute precipitates of spinel can be seen in the body of the periclase grains.

The compositions of the materials of FIGURES 1, 2 and 3 are shown in Tabel III. The relative scale of the photomicrographs reproduced in the drawing for FIGURES 1, 2 and 3 is 2:1:2.

TABLE III

|  | Figure I | Figure II | Figure III |
|---|---|---|---|
| MgO | 60.7 | 71.45 | 60.7 |
| $Cr_2O_3$ | 20.4 | 14.59 | 20.4 |
| $SiO_2$ | 1.0 | 0.9 | 1.0 |
| FeO | 10.4 | 7.11 | 10.4 |
| CaO | 0.7 | 1.61 | 0.7 |
| $Al_2O_3$ | 5.9 | 4.37 | 5.9 |

It can be seen that the material of this invention, as exemplified in FIGURES 1 and 2 although of substantially the same analysis as that of FIGURE 3, has a markedly different structure. In particular, it can be seen that the structure of the material of this invention is characterized by relatively large periclase grains and isolated pockets of silicates whereas in the material of FIGURE 3, the periclase grains are much smaller and the silicates are not isolated but instead form what can be considered to be a continuous phase surrounding the periclase grains. The periclase grains of the material of FIGURES 1 and 2 have a 1.0 mm. average diameter whereas the periclase grains of the material of FIGURE 3 have a 0.01 mm. average diameter.

The improved properties of the refractory material of the present invention, viz. high density, low porosity, and crushability, are directly attributable to its novel structure, composition, and method of formation.

The low porosity of the material is due largely to the slow solidification of the melted chrome ore-magnesia mixture which permits the escape of gaseous material from the melt. The improved crushability, as previously mentioned, is due largely to the fact that the constituent periclase grains of the re-solidified refractory material are quite large to begin with, i.e., average diameter about 1.0 mm. and since the periclase grains and the entire refractory mass are pre-stressed by rapid cooling after re-solidification.

The following examples are provided to further illustrate the present invention.

*Example I*

A mixture was prepared containing forty percent Transvaal ore and 60 percent of low calcined "caustic" sea water magnesia.

The composition of the ore and magnesia are set forth in Table IV.

TABLE IV

|  |  | Chrome Ore | "Caustic" Magnesia |
|---|---|---|---|
| $SiO_2$ | percent by weight | 1.6 | 1.5 |
| CaO | do | 0.5 | 1.0 |
| MgO | do | 10.8 | 97.1 |
| FeO | do | 25.1 | 0.3 |
| $Cr_2O_3$ | do | 46.0 | --- |
| $Al_2O_3$ | do | 14.2 | 0.1 |

The mixture was prepared in 5000 pound lots and was melted and re-solidified in a single phase, two-electrode furnace having a water-cooled shell which was lined interiorly with partially fused chrome ore-magnesia material. The mix was fed continuously over a period of time into the furnace in the usual manner of "making a hearth" and a pool of molten material was developed in the furnace. The electrodes were gradually withdrawn as the melting proceeded with the result that the molten material gradually and slowly solidified in the furnace to "form a hearth." When the melting and resolidification of the material was completed, the solidified material was quickly cooled in the furnace by means of the cooling water provided in the furnace shell. The cooling to about room temperature took less than about 2 hours, after which the hearth material was broken out, cleaned, and then particulated into 10 in. x D lumps.

The refractory material obtained contained by analysis:

| $SiO_2$ | 1.38 |
|---|---|
| CaO | 1.57 |
| MgO | 62.55 |
| FeO | 10.64 |
| $Cr_2O_3$ | 18.21 |
| $Al_2O_3$ | 5.78 |

The structure of the material closely resembled that of FIGURES 1 and 2 and comprised large periclase grains, spinel crystals, and isolated pockets of silicate material.

*Example II*

Fused refractory material of this invention prepared as in Example I and having essentially the same composition and structure was passed through a jaw-crusher which was set at an opening of approximately ½ inch. The material crushed easily and less than 3 percent of the crushed material was finer than 10 mesh.

With fused refractory material having about the same chemical analysis but which was prepared by melting, quick cooling and annealing, and which had a structure as shown in FIGURE 3, 20 percent of the material was finer than 10 mesh after the same crushing treatment.

In a further embodiment of the present invention, the product obtained after crushing and particulating of the pre-stressed furnace product is used directly in the manufacture of burned bricks. These bricks have particularly advantageous properties, viz. high density, low porosity, low gas permeability, re-heat stability, superior resistance to spalling, high strength at elevated temperatures, high resistance of molten iron oxide (iron bursting), and high resistance to corrosion from furnace gases.

These advantageous properties are directly attributable to the structure and composition of the particular refractory material of this invention.

The strength of the brick is enhanced since the silicates in the constituent refractory material occur in pockets which act to relieve the stresses to which the brick is subjected in furnace operation. Also, since the silicates do not occur in a continuous phase, there is substantially no weakening of the brick at higher temperatures when the silicates are fluidized. This is due to the fact that the structure of the constituent refractory material comprises essentially a crystal to crystal bond as illustrated in FIGURES 1 and 2.

As to re-heat stability, the presence of silicates in pockets instead of as a continuous phase avoids volume change upon melting of the silicates at service temperatures as in the case when the silicates exist as a continuous phase. For the same reason, the burned brick of this invention has increased resistance to spalling, i.e., resistance to deterioration on account of cyclic temperature variation.

The resistance to "iron bursting" is also enhanced due to the fact that the silicates in the refractory material are isolated and not in a continuous phase. By being so isolated, the silicates cannot act as a channel for the conduction of iron bearing oxides into the brick.

Also, improved gross porosity is obtained in the burned brick of this invention, not only on account of the low porosity of the constituent refractory material but also since the volume stability of the refractory material largely prevents aggravation of the inherent voids in burned bricks.

Also, the prescribed compositional ranges of the refractory material of this invention are critical.

The specified proportions of magnesia, chrome oxide and alumina are required so that the aforementioned treatment of the mix will result in a refractory material which comprises a major proportion of large periclase grains and a minor proportion of spinel crystals which are mostly contained within the preiclase grains.

It is also necessary that the magnesia, chrome oxide and alumina contents be in the ranges specified so that the product material has the rferactoriness, high temperature strength and heat shock resistance necessary for furnace operation.

The specified silica content is particularly critical since amounts greater than about 3 percent lead to the formation of a continuous silicate phase which becomes liquid at higher temperatures with detrimental effect upon the brick, particularly as regards high temperature service strength and volume stability.

At least 0.5 percent $SiO_2$ is necessary in the refractory material of this invention in order to provide adequate room temperature strength in the burned brick. $SiO_2$ content between 0.5 percent and 3 percent, when the silica containing phase is present in isolated pockets, results in good room temperature strength and does not adversely affect the high temperature strength of bricks made from this material.

With regard to the iron content, it has been found that between 3 and 15 percent iron oxide as FeO can be tolerated in the product without adversely affecting the advantageous properties of the material and bricks of this invention. Higher valence iron oxides can be present with FeO when the aggregate of iron oxides does not exceed about 16 percent.

In addition, the molar ratio of lime to silica in the material of this invention must be 2:1 or less since at higher ratios the refractory material has unsatisfactorily low strength and low resistance to "iron bursting."

With further regard to burned bricks of this invention, these and like articles are prepared by first crushing fused refractory material of this invention to a desired particle size distribution in accordance with known techniques. The crushed material is then mixed with a suitable binder such as Bindarene, a lignin sulfonate binder, and the mix is pressed to the desired shape and size. After pressing, the brick is dried if necessary and fired to produce a ceramic bond between the particles which is sufficient to permit handling and installation. It has been found that heating for about 3 hours at 1600° C. is sufficient for this purpose. An important advantage of the refractory material of the present invention is that die size allowances are not necessary in pressing the brick since there is negligible volume change in the brick during the subsequent firing. This advantageous property is directly attributable to the novel structure of the refractory material of this invention as aforedescribed.

When a satisfactory ceramic bond has been provided between the refractory particles as a result of firing, the burned brick is ready for installation and use as a basic refractory in steel furnace construction.

The following example is provided to further illustrate the manufacture of the burned brick of the present invention.

*Example III*

Refractory material of this invention prepared as in Example I and having essentially the same composition and structure was crushed to obtain 1 in. by D material. This material was then passed through a two-step gyratory crushing and part of the resulting material was processed through a vibrating mill to obtain a desired particle size distribution.

The sizing of the material obtained was as shown in Table V.

TABLE V

| Proportion: | Particle size, mesh |
|---|---|
| 28% | −½ +¼ |
| 15% | −4 +8 |
| 16% | −8 +20 |
| 15% | −20 +60 |
| 6% | −60 +150 |
| 5% | −150 +325 |
| 15% | −325 |

Screening was not necessary to obtain the above distribution and the distribution can be readily reproduced due to the substantially uniform nature of the material of the present invention.

The sized material was subsequently mixed in a rotating mixer with 2.5 to 3 percent by weight of an aqueous 40 percent solution of Bindarene, a lignin sulfonate binder. A weighed amount of the mix was pressed to approximately 10,000 p.s.i. in a steel die to produce a brick 9″ x 2½″ x 4½″. The pressed brick was dried in a tunnel drier at 110° C. After drying, the brick was fired at 1600° C. for 3 hours to develop a ceramic bond between the refractory particles. It was found that the brick had sufficient strength for handling and installation and could be used directly in steel furnace construction.

In order to provide comparative data showing the unobvious benefits of the present invention, different refractory materials, indicated in Table VI as I and II, were prepared and tested.

TABLE VI

| Material | Apparent Porosity, percent | Reheat Change, percent | Under-load Deformation, percent | Iron Bursting Area Expansion, percent |
|---|---|---|---|---|
| I 62.1% MgO 17.9% Cr₂O₃ 5.9% Al₂O₃ 11.0% FeO 1.0% SiO₂ 0.7% CaO | 16–16.5 | 0 | 0.8–1.2 | 1.7 |
| II 60.4% MgO 18.2% Cr₂O₃ 4.9% Al₂O₃ 11.2% FeO 2.7% SiO₂ 0.9% CaO | 18–20 | −1.7 | 4.13 | 6.4 |

Material I is a product of this invention having a structure as shown in FIGURE 1 and was prepared as an electric furnace hearth product in the manner previously described.

Material II is a fused material having a structure as shown in FIGURE 3.

Materials I and II were separately treated by crushing to obtain separate batches of refractory particles having substantially the same particle size distribution.

Burned bricks, 9″ × 4″ × 2½″, were then prepared by identical and conventional methods from the different I and II materials. Brick preparation included firing at 1600° C. for three hours.

A brick prepared from material I and a brick prepared from material II were tested under identical conditions. The results of the test are shown in Table VI. Also, unfired samples of particulated material were also tested and compared as regards porosity.

The tests to which the burned bricks were subjected are as follows:

*Apparent porosity.*—This test involves evacuating the open pores of a sample and then re-filling the pores with water to make possible a determination of porosity. The test performed was substantially the same as ASTM test C20–46, except that instead of boiling the sample material, the specimens were evacuated under reduced pressure and then covered with water.

*Iron bursting.*—A 200 gram sample of mill scale ($Fe_3O_4$) was placed on a cut surface of a brick (2½″ × 4½″). The material under test was heated up to 1650° C. over a period of 5 hours and held at this temperature for 3 hours. The increase in area of the cut surface, measured after the brick is cooled, is a measure of iron bursting.

*Reheat change.*—This test involves heating a sample to an elevated temperature and subsequently measuring the resultant dimensional change. This test was substantially the same as ASTM test C113–46 except that the test specimens were heated to 1750° C. and maintained at this temperature for 1½ hours.

*Deformation under load.*—This test involves heating a sample under compressive loading for an elevated temperature and maintaining this temperature for a definite period. The deformation is measured at room temperature. The test performed was substantially the same as ASTM test C16–49 except that the specimen under test was heated over a period of 5 hours to 1650° C. The specimen was held at 1650° C. and the percent linear contraction measured. The load on the specimen under test was 25 p.s.i.

In addition to testing burned bricks, unfired particles of materials I and II were tested for porosity. The measured porosity of particles of material I of this invention was 2.14 percent. The measured porosity of particles of material II was 7.84 percent.

Although the foregoing description has been directed somewhat specifically to the manufacture of burned brick, the refractory material of this invention can be used with advantage in making chemically bonded bricks or like articles. This is accomplished by ordinary techniques using conventional chemical bonding agents such as magnesium chloride or magnesium sulfate. The resultant chemically bonded bricks have improved properties due to the aforementioned characteristics of the constituent refractory material.

The mesh sizes referred to in the foregoing description are Tyler series.

What is claimed is:

1. As a refractory material, a melted and re-solidified mixture of chrome ore and magnesia consisting essentially of by analysis 15 to 25 percent $Cr_2O_3$; 45 to 75 percent MgO; 4 to 20 percent $Al_2O_3$; 3 to 15.0 percent FeO; 0.5 to 3.0 percent $SiO_2$; and up to 3.0 percent CaO; the molar ratio of CaO and $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

2. As a refractory material, a melted and re-solidified mixture of chrome ore and magnesia consisting essentially of by analysis 14 to 20 percent $Cr_2O_3$; 60 to 70 percent MgO; 4 to 10 percent $Al_2O_3$; 5 to 10 percent FeO; 0.5 to 1.5 percent $SiO_2$; and up to 1.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

3. A melted, re-solidified and particulated mixture of chrome ore and magnesia consisting essentially of by analysis 15 to 25 percent $Cr_2O_3$; 45 to 75 percent MgO; 4 to 20 percent $Al_2O_3$; 3 to 15.0 percent FeO; 0.5 to 3.0 percent $SiO_2$; and up to 3.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

4. A melted, re-solidified and particulated mixture of chrome ore and magnesia consisting essentially of by analysis 14 to 20 percent $Cr_2O_3$; 60 to 70 percent MgO; 4 to 10 percent $Al_2O_3$; 5 to 10 percent FeO; 0.5 to 1.5 percent $SiO_2$; and up to 1.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

5. As a refractory material, an electric furnace hearth product in particulated form and consisting essentially of by analysis 15 to 25 percent $Cr_2O_3$; 45 to 75 percent MgO; 4 to 20 percent $Al_2O_3$; 3 to 15.0 percent FeO; 0.5 to 3.0 percent $SiO_2$; and up to 3.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

6. As a refractory material, an electric furnace hearth product in particulated form and consisting essentially of by analysis 14 to 20 percent $Cr_2O_3$; 60 to 70 percent MgO; 4 to 10 percent $Al_2O_3$; 5 to 10 percent FeO; 0.5 to 1.5 percent $SiO_2$; and up to 1.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

7. As a refractory article, pressed and fired particles of refractory material consisting essentially of by analysis 15 to 25 percent $Cr_2O_3$; 45 to 75 percent MgO; 4 to 20 percent $Al_2O_3$; 3 to 15.0 percent FeO; 0.5 to 3.0 percent $SiO_2$; and up to 3.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

8. As a refractory article, pressed and fired particles of refractory material consisting essentially of by analysis 14 to 20 percent $Cr_2O_3$; 60 to 70 percent MgO; 4 to 10 percent $Al_2O_3$; 5 to 10 percent FeO; 0.5 to 1.5 percent $SiO_2$; and up to 1.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

9. As a refractory article, chemically bonded particles of refractory material consisting essentially of by analysis 15 to 25 percent $Cr_2O_3$; 45 to 75 percent MgO; 4 to 20 percent $Al_2O_3$; 3 to 15.0 percent FeO; 0.5 to 3.0 percent $SiO_2$; and up to 3.0 percent CaO; the molar ratio of CaO to $SiO_2$ in said material being no greater than 2:1 and the structure of said material comprising predominantly, relatively large, abutting grains of periclase, crystals of spinel contained within said periclase grains, and isolated pockets of silicates contained within said periclase grains.

References Cited in the file of this patent

UNITED STATES PATENTS

| | | |
|---|---|---|
| 2,279,260 | Benner et al. | Apr. 7, 1942 |
| 2,599,566 | Magri | June 10, 1952 |
| 2,690,974 | Magri | Oct. 5, 1954 |